(12) United States Patent
Heatwole

(10) Patent No.: US 11,473,314 B2
(45) Date of Patent: Oct. 18, 2022

(54) MODULAR FLOORING SYSTEM FOR AGRICULTURAL ANIMAL AND POULTRY HOUSES

(71) Applicant: Oren Heatwole, Broadway, VA (US)

(72) Inventor: Oren Heatwole, Broadway, VA (US)

(\*) Notice: Subject to any disclaimer, the term of this patent is extended or adjusted under 35 U.S.C. 154(b) by 321 days.

(21) Appl. No.: 16/778,102

(22) Filed: Jan. 31, 2020

(65) Prior Publication Data

US 2021/0238864 A1    Aug. 5, 2021

(51) Int. Cl.
*E04F 15/02* (2006.01)
*A01K 31/18* (2006.01)
*A01K 1/00* (2006.01)

(52) U.S. Cl.
CPC .......... *E04F 15/02005* (2013.01); *A01K 1/00* (2013.01); *A01K 31/18* (2013.01)

(58) Field of Classification Search
CPC ........ A01K 1/10; A01K 31/18; A01K 31/007; A01K 1/015; A01K 1/0151; E04F 15/02005
USPC .......................................................... 119/416
See application file for complete search history.

(56) References Cited

U.S. PATENT DOCUMENTS

| | | | |
|---|---|---|---|
| 3,043,407 A | 7/1962 | Marryatt | |
| 4,048,960 A | 9/1977 | Barnidge et al. | |
| 4,953,501 A | 9/1990 | Moreau | |
| 5,456,209 A * | 10/1995 | Heinrich | A01K 1/015 119/448 |
| 5,474,831 A * | 12/1995 | Nystrom | B27B 1/00 404/46 |
| D397,457 S | 8/1998 | Hutchings | |
| 5,813,365 A | 9/1998 | Helmy | |
| 5,937,793 A * | 8/1999 | Church | A01K 1/0151 119/528 |
| 6,047,663 A * | 4/2000 | Moreau | A01K 1/0151 119/526 |
| 6,079,366 A | 6/2000 | Telleen | |
| 6,810,834 B2 | 11/2004 | Hutchings et al. | |
| 6,889,631 B2 | 5/2005 | McGregor | |
| 7,107,935 B2 | 9/2006 | Mooney | |
| 7,310,919 B2 | 12/2007 | Grossman et al. | |
| 8,793,929 B1 * | 8/2014 | Walsh | A01M 23/30 43/131 |
| 9,497,936 B2 | 11/2016 | Foreman et al. | |

(Continued)

*Primary Examiner* — Brady W Frazier
*Assistant Examiner* — Zoe Tam Tran
(74) *Attorney, Agent, or Firm* — John H. Thomas, P.C.

(57) ABSTRACT

An agricultural animal house modular flooring system is provided, the flooring being particularly suited to poultry housing due to the structure of the flooring which facilitates cleaning, minimizes build-up of manure, bacteria and pathogens, and reduces risk of injury to the poultry. A plurality of interconnecting flooring panels and a plurality of panel support beams are provided. The panels each have pluralities of side flanges and recesses and end bosses and apertures for coupling the panel to a horizontally adjacent panel. The support beams provide interlocking engagement with the panels, prevent lateral disengagement of the panels, and distribute load from the panels and flanges to lower regions of the support beams to provide a support base of optimal strength and durability. The modular design of the flooring system provides for easy installation, assembly and disassembly of the flooring system.

13 Claims, 12 Drawing Sheets

(56) References Cited

U.S. PATENT DOCUMENTS

| | | | | |
|---|---|---|---|---|
| 10,294,656 B2* | 5/2019 | Fox | ............ | E04B 1/2612 |
| 10,362,777 B1* | 7/2019 | Walsh | ............ | A01M 23/30 |
| 2001/0032596 A1* | 10/2001 | McElroy | ............ | A01K 1/0151 |
| | | | | 119/526 |
| 2003/0213202 A1* | 11/2003 | Hutchings | ............ | A01K 1/0151 |
| | | | | 52/578 |
| 2017/0127654 A1 | 5/2017 | Foreman et al. | | |

* cited by examiner

MODULAR FLOORING SYSTEM FOR AGRICULTURAL ANIMAL AND POULTRY HOUSES

CROSS-REFERENCE TO RELATED PATENT APPLICATIONS

NONE

STATEMENT REGARDING FEDERALLY SPONSORED RESEARCH OR DEVELOPMENT

NONE

BACKGROUND OF THE INVENTION

Field of Use Statement

The present disclosure generally relates to the field of animal husbandry; more particularly, to a modular flooring covering system for agricultural animal and poultry houses.

Description of Related Art

The use of floor coverings for agricultural enterprises such as animal and poultry operations is well known as a method of keeping animal enclosures and houses clean. Flooring grates or panels supported on structures of beams or rails above manure pits, soil or concrete ground, or poultry litter enables animal and poultry wastes to pass through to the lower ground level while supporting the animals above the manure and waste.

The cleanliness of housing in which animals and poultry are raised is critical because confined animals and poultry are susceptible to disease caused by pathogens. In addition, the flooring must be configured with slots so that manure passes through the flooring panels and away from the animals or poultry without being caught in cracks, crevices, or rough or irregular surfaces of the flooring. Moreover, grated or slotted flooring panels must also provide sufficient support for the weight of the animals without injuring the feet of the animals or poultry. Within this field, various designs of flooring have been implemented to facilitate installing floor panels on underlying beams to ensure that both large and small animals or poultry are supported on the flooring while still permitting their manure to be passed or washed through the panels.

Consequently, the flooring used for animal and poultry houses must be easy to clean and maintain in order to minimize the risk of disease which may be caused by a build-up of pathogens, particularly bacteria, from manure on or within any slots, cracks or crevices in the flooring and should also be easy to assemble and disassemble. Such flooring is usually cleaned using a pressurized hose on the top side of the flooring which washes off the top of the flooring and also the area below the flooring. Modular flooring systems available to date provide generally uniform shaped interconnecting grating panels in which one configuration is used for a complete flooring. The panels of such systems may be installed in one orientation only. A disadvantage of these systems is that such panels cannot be installed in a rotated or in a customized configuration for houses having particularly dimensioned floor plans. This means that when such panels are installed in an area having dimensions requiring only a portion of a panel the unused portion such panel is discarded. A further disadvantage of associated with such systems is that the grated panels of such systems do not closely about the walls of the enclosures or rooms which the animals or poultry, but instead leave openings along the sides of walls. Particularly in the case of poultry farms, where watering troughs or drinking lines are located, resulting in water leakage, the build-up of manure accelerates the growth of harmful pathogens. For some such systems, panels often do not fit together and leave openings, small cracks and crevices in which manure can collect. Such build-up of manure cannot be readily removed or dislodged by the normal washing process with the result that significant quantities of manure remain even after washing. Accordingly, there is a need for animal or poultry housing with a modular flooring system which can be installed in areas of various dimensions without wasting large portions of panels and which facilitates the panels smoothly abutting the walls and fixtures of the housing or room in which the flooring is installed without leaving openings therebetween the walls, fixtures and flooring.

Poultry houses raise domesticated birds such as chickens, turkeys, ducks and geese, for the purpose of harvesting meat or eggs for food. Poultry is farmed in great numbers, with chickens being the most numerous. Therefore, for convenience, reference will be made specifically to chickens, although it is to be understood that the invention is not limited to chickens. Chickens raised for eggs are usually called layers while chickens raised for meat are often called broilers or fryers, depending on their size and suitability for various cooking methods. Many parts of a chicken are consumed as food, including their feet. Therefore keeping chickens' feet clean and healthy is important.

Generally, chickens are housed in chicken houses. Chicken houses typically include walls enclosing a floor, a nourishment area for nourishment dispensing units which can include water troughs and food dispensers, and, for layers, nesting boxes or caged housing systems. The floor typically has a surface area, which, traditionally, is often substantially covered by "poultry litter". The litter generally extends all of the way into the nourishment area and thereby covers the floor below nourishment dispensing units and water troughs. When chickens drink or splash water, or evacuate onto the litter in the nourishment areas, the litter in the area becomes wet with water and droppings. Such litter thereby can become contaminated and harbor bacteria. As a result, in order to obtain nourishment, chickens must walk through the litter, which is likely to be the wettest area in the chicken house.

Poultry litter includes organic waste produced from chickens. Litter is a mixture of poultry excreta, spilled feed, feathers and bedding materials. Most poultry are grown on dirt floors with some type of bedding material. Common bedding materials include dry, absorbent, low-cost organic materials such as wood chips, soft wood shavings, sawdust, peanut hulls, rice hulls shredded sugar cane, straw, and occasionally, sand. The poultry litter bedding materials absorb moisture, thereby limiting the production of ammonia and harmful pathogens. The bedding materials may have a significant impact on bird performance and carcass quality. Poultry litter is maintained and managed at low moisture levels to maximize the health and productivity of the flocks raised thereon. Moist or caked litter causes severe problems in wet areas such as near leaky watering troughs or roofs. Watery droppings may also be a cause of excess moisture. If litter is not maintained at an acceptable moisture level, very high bacterial loads and unsanitary growing conditions result in footpad lesions, bursal disease, breast bruises and blisters. As chickens continue to walk through effected litter, they remain in contact with moisture from manure droppings and water. In such an environment, the chickens' feet are particularly at risk for footpad dermatitis. This affects the health of the flock and results in quality issues when the birds reared under such conditions reach a processing plant. Used poultry litter traditionally is used as livestock feed for cattle, utilized as a source of fertilizer for crops or pastures, or as a bio-fuel source for electrical co-generation and gasification for electrical and heating applications.

Chicken houses may use elevated flooring grates or slotted panels in place of litter. Bird manure droppings and leaking water pass through the slots in the floor panels thereby removing most waste from proximity to the chickens. Elevated grated flooring serves to elevate chickens from droppings and moist litter; however, this results in a build-up of bacteria from manure within the small cracks and crevices of the panels that cannot be readily removed or dislodged by the normal washing process. In fact, the washing process has a tendency to tightly pack manure into these cracks with the result that significant quantities of manure remain even after washing. Thus, grated or paneled floors may cause or worsen injury to the feet of a chicken resulting in conditions such as bumblefoot, or swollen feet, leg or hock joints.

Accordingly, as a result of these deficiencies in the design of past systems, there is a need for animal and poultry housing with modular flooring which overcomes these problems and which provides a flooring system which minimizes the risk of bacteria and bacterial build-up, protects the animals or poultry, and particularly their feet, from injury and from continual contact with damp litter, manure or droppings.

Further still, there is a need for a modular flooring covering system having flooring panels which are fully supported by a beam system to improve the overall strength and durability of the flooring, ensure the animals or poultry are comfortably supported on the flooring while allowing manure to pass therethrough the floor, and which specifically is easy to install, assemble and disassemble.

BRIEF SUMMARY OF THE INVENTION

In accordance with the present disclosure there is provided a modular flooring system for an agricultural animal or poultry housing. The flooring system comprises a plurality of flooring panels for support on elongate support beams. Each of the flooring panels comprise side edges having a plurality of flanges defining a plurality of recesses between adjacent flanges adapted for mating engagement with corresponding flanges and recesses of an adjacent panel; and end edges having a plurality of bosses and apertures adapted for interlocking engagement with corresponding bosses and apertures of an adjacent panel.

In accordance with one aspect of the claimed invention, the elongate support beams comprise an outwardly sloping base having a generally triangular cross section and arcuate bottom surface that serve to distribute any weight or pressure load from the flooring panels and flanges against the lower portion of the elongate support beam and thereby remove load from the flanges of the flooring panels.

In accordance with another aspect to the claimed invention, the elongate support beams provide a gripping surface for frictional engagement with the flooring panels to provide interlocking engagement with the panels and prevent disengagement and lateral displacement of the flanges with respect to the elongate support beam to provide a secure support base of optimal strength and durability.

In accordance with yet another aspect of the claimed invention, the modular design of the flooring system provides for easy installation, assembly and disassembly of the flooring system. The various components of the modular flooring panels and elongate support beams are disconnectable from each other to facilitate cleaning of the flooring system and to enable replacement of a small component thereof rather than having to replace the flooring if one small section becomes corroded or deteriorates in some manner.

In accordance with yet another aspect of the claimed invention, the flooring panels are further provided with top and bottom surfaces having slots extending therethrough. The slots are sized, shaped, and positioned to allow animals or poultry to comfortably walk over the surface area of the flooring panel but not to allow the feet of the animals to pass through the slots in order to minimize the risk of injury to the feet and legs of the animals or poultry housed therein. The flooring panels and slots therethrough further comprise non-porous surface materials having low surface energies which are resistant to microbial biofilm and bacteria attachment. This helps to reduce the build-up of manure, facilitate cleaning of the panels, and improve the condition and health of the housed animals or poultry.

In accordance with still yet another aspect of the claimed invention, the flooring panels are constructed with bottom surfaces formed with V-shaped structures which enable the panels to be stacked in a nesting configuration for efficient transportation, shipping and storage thereof.

The system of the present disclosure has been developed in response to problems and needs in the field of animal husbandry that have not yet been fully resolved by currently available systems. As will be readily appreciated from the foregoing, the present invention avoids the disadvantages of currently available systems; thus, the system disclosed herein provides a solution to current challenges within the art. These and other features, aspects and advantages in accordance with the claimed invention will become better understood with reference to the following description, appended claims and accompanying drawings.

The above summary is provided merely for purposes of summarizing some example embodiments of the invention so as to provide a basic, understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

DETAILED DESCRIPTION

Embodiments of the claimed invention will be best understood by reference to the accompanying drawings, which are not necessarily to scale, and wherein like reference numbers indicate identical or functionally similar elements. For purposes of clarity, the spaces between the components are not to scale but enlarged to better illustrate the operation of the device. It will be readily understood that the components of the present invention, as generally described and illustrated in the figures herein, could be arranged and designed in a wide variety of different configurations. The claimed invention may be embodied in many different forms and should not be limited to the illustrated embodiments disclosed. Rather, these embodiments are provided so that this disclosure will be thorough and complete, and will fully convey the scope of the claimed invention to those skilled in the art. Thus, the following more detailed description, as represented in the figures, is not intended to limit the scope of the invention as claimed, but is merely representative of presently preferred embodiments of the invention.

Figure 1:
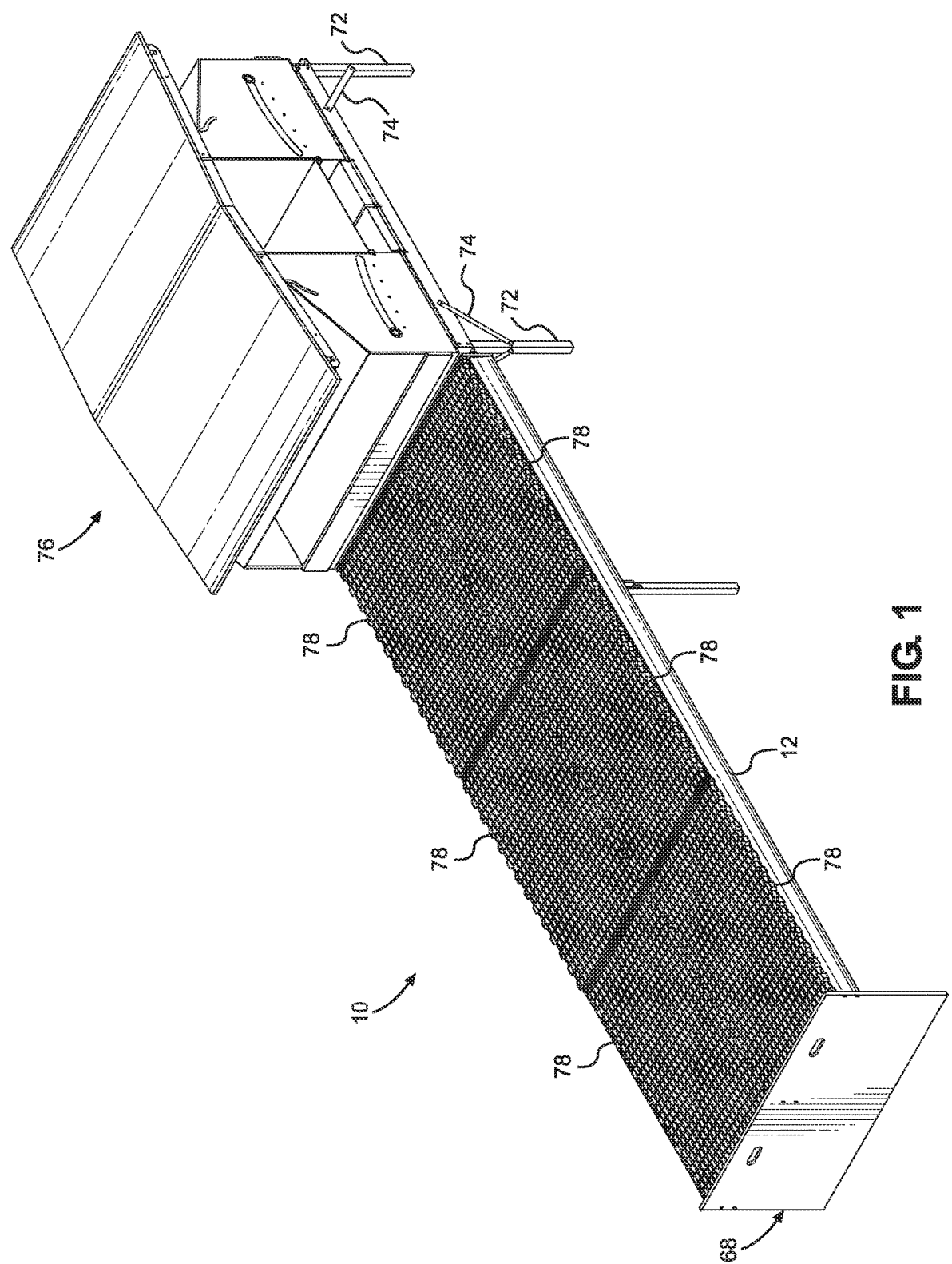
FIG. 1 is a plan view of a floor covering system or an agricultural animal house or enclosure.
Figure 2:
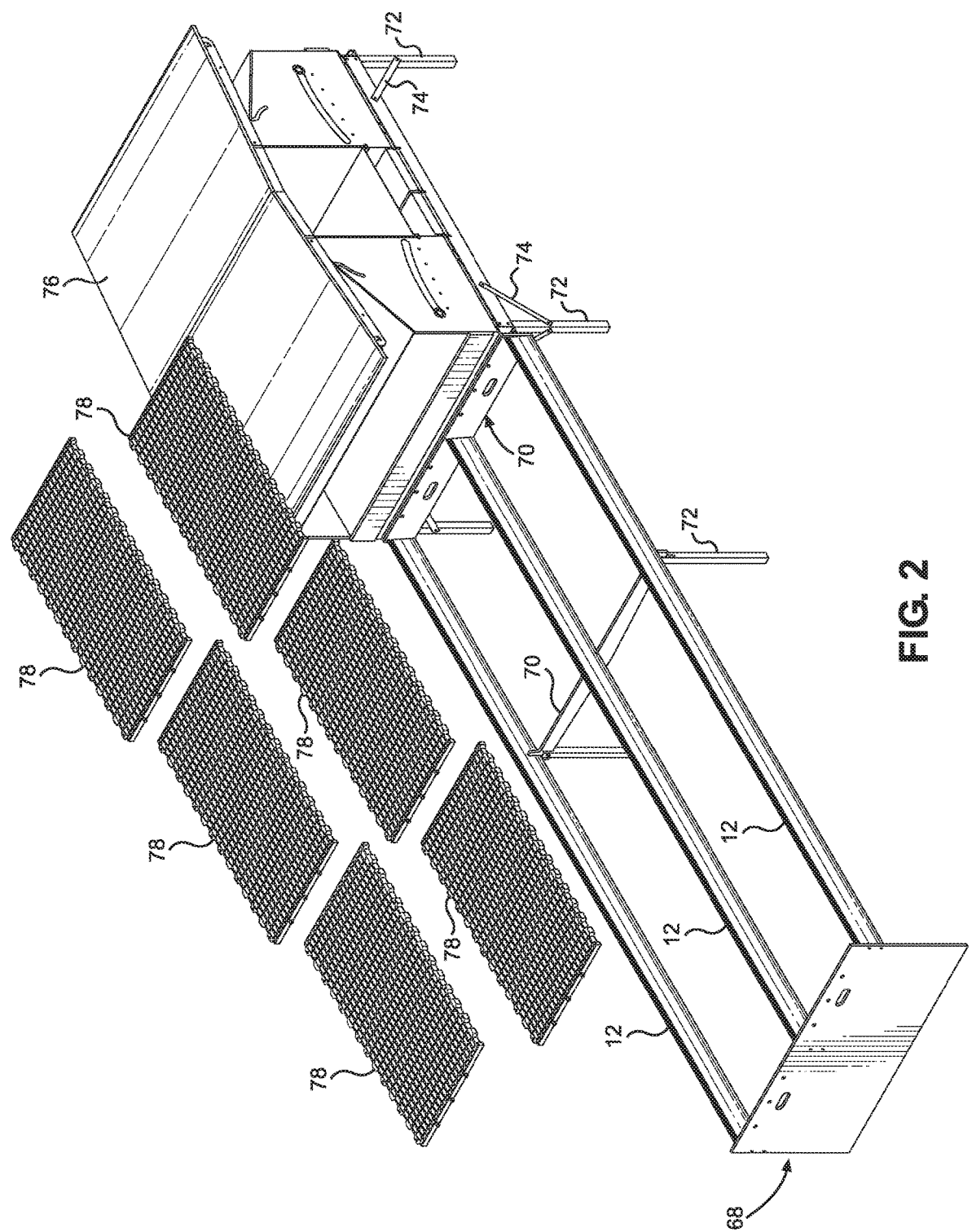
FIG. 2 is an exploded view of the floor covering system of FIG. 1.

FIGS. 1-15 illustrate schematically an improved flooring system for animal or poultry housing. FIG. 1 of the drawings shows a perspective top view of the preferred flooring system 10 of the claimed invention. FIG. 2 shows an exploded view of this system 10. Referring now to the Figures in more detail, FIGS. 1 and 2 illustrate an embodiment of an improved poultry enclosure including a covered enclosure such as a chicken nesting box 76 where reference numeral 10 indicates the improved flooring system. As can be seen in FIGS. 1 and 2, the box 76 is positioned adjacent flooring system 10. Flooring system 10 is installed above the poultry house ground surface (not shown) that may be of either a dirt, soil or concrete floor ground surface with or without litter present, as is conventional in modern poultry houses. Crossbeams 70 configured to legs 72 and leg braces 74 cooperate with interconnected end frame board 68 to support and elevate flooring system 10 and box 76. Flooring panels 78 in accordance with the claimed invention are shown configured to an elongate support beam 12, as will be more fully described herein. As shown in FIGS. 1-2, a plurality of floor panels 78 may be interconnected together to create a floor surface on the elongate support beams 12.

Although a preferred embodiment illustrated in FIGS. 1-2 includes a nesting box, those having ordinary skill in the art will understand the term "nesting box" is used in a functional sense indicating a generally smaller shelter or structure within animal or poultry housing that an animal uses as for a resting, sleeping, laying, birthing or nursing space. Examples of other forms include, but are not limited to, hutches, kennels, pens, crates, cubbies, coops, platforms, roosts, and perches. Those of skill in the art will understand that any suitable structure may be used in forming the boxes described herein. Those of skill in the art will understand that a number of variations may be made in the disclosed embodiments, all without departing from the scope of the claimed invention.

Figure 3:
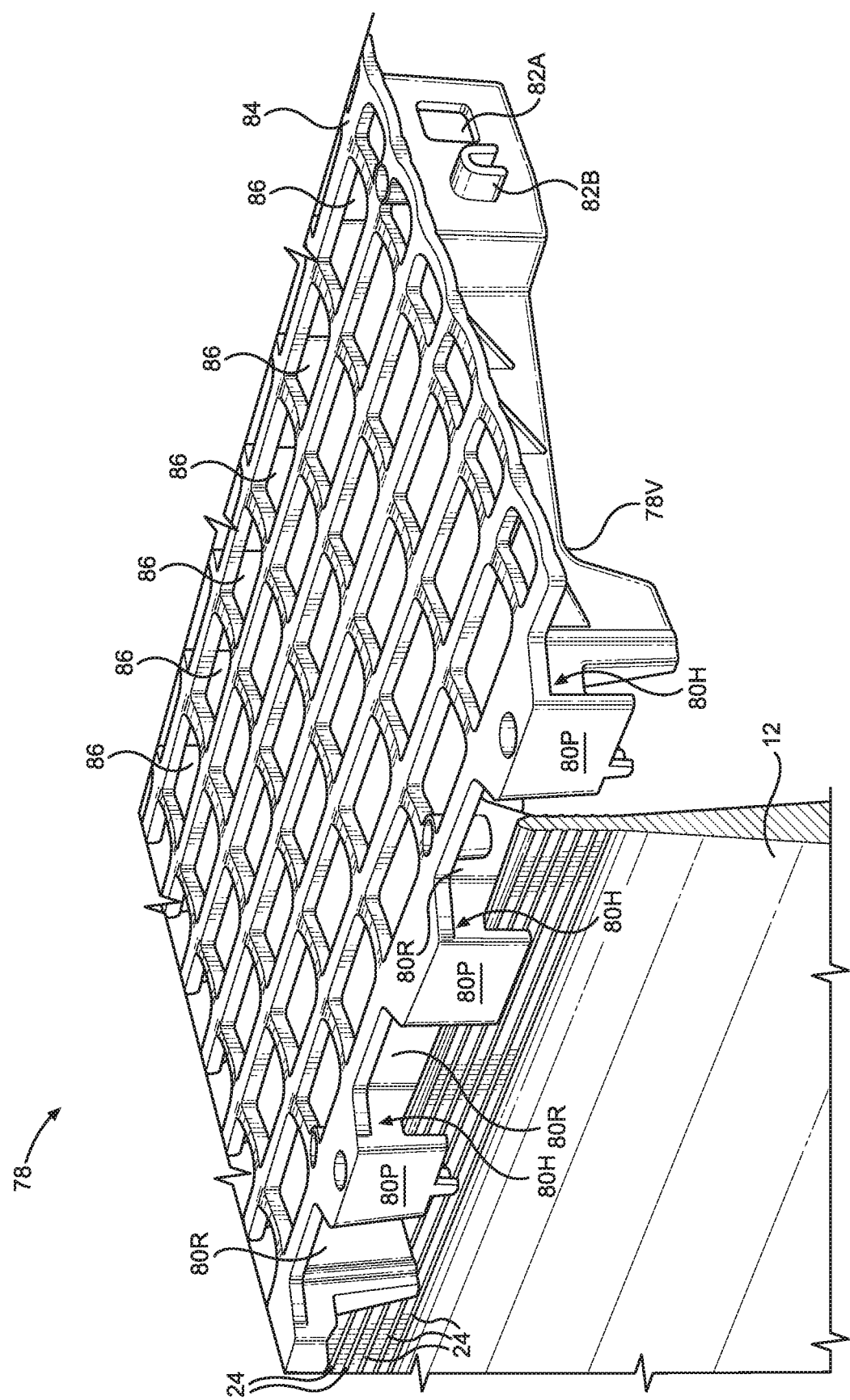
FIG. 3 is a perspective view of the floor panel of FIG. 1 interfacing in fitting engagement with the elongate support beam of FIG. 1.
Figure 6:
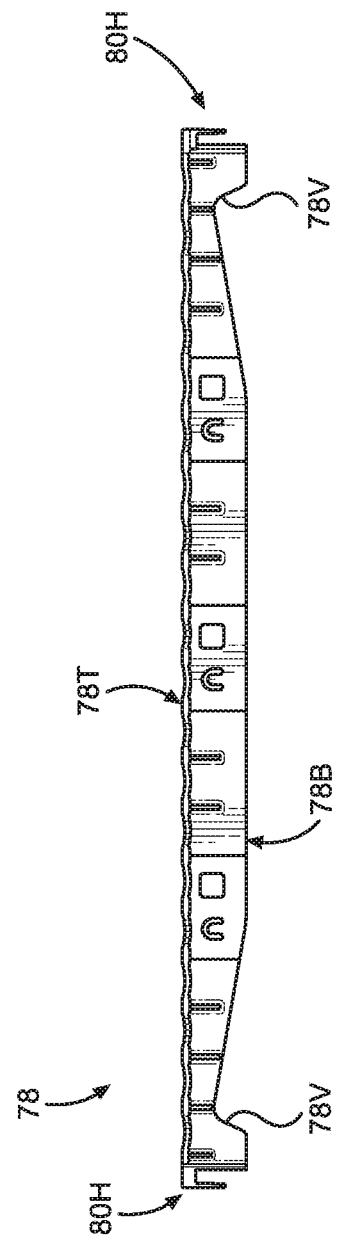
FIG. 6 is an end view of the floor panel.

As shown in FIGS. 3-6, each flooring panel 78 is characterized by a flooring panel top surface 78T, a flooring panel bottom surface 78B, panel side edge beam-engaging flanges 80, a panel end edge U-shaped protrusion forming a boss 82B and a panel end edge aperture 82A. As shown in FIGS. 3 and 6, the flooring panel 78 bottom surface 78B is formed in a V-shape which thereby enables the panels to be stacked in a nesting configuration for efficient transportation, shipping and storage thereof. Flanges 80 include a system of alternating laterally extending flange projections 80P and recesses 80R designed to fit together in mating engagement with corresponding side edge projections and recesses on an adjacent panel. The end edge boss 82B and aperture 82A are designed to interlock with corresponding end edge bosses and apertures on an adjacent panel in an end-to-end arrangement in a manner similar to the spacing between flanges. The side flange coupling members and end coupling members may be configured as mirror images of each other for coupling panels to adjacent like panels. It will be understood that floor panel coupling members may be any male-female or interlock-type of connector which is suitable for establishing mirror image side members. In a preferred embodiment, engagement of the side flange 80 projections 80P and recesses 80R, and the end edge bosses 82B and apertures 82A of the panels, couple horizontally adjacent panels, whereby, in preferred embodiment, the flooring panels 78 matingly interconnect in abutment such that the interlocked panels are generally coplanar. In alternative embodiments, constructions wherein adjacent panels angle downwardly or upwardly thereby forming ramps enabling animals or poultry to access lower or upper levels, and other modifications are contemplated while remaining within the scope of the present disclosure or appended claims, as will be appreciated by those skilled in the art, along with other benefits and advantages of the present invention. It will be understood that the angles of any ramp portions and the length of any ramp portions can be a function of the typical size of the animals intended to be housed on the flooring system 10.

Figure 4:
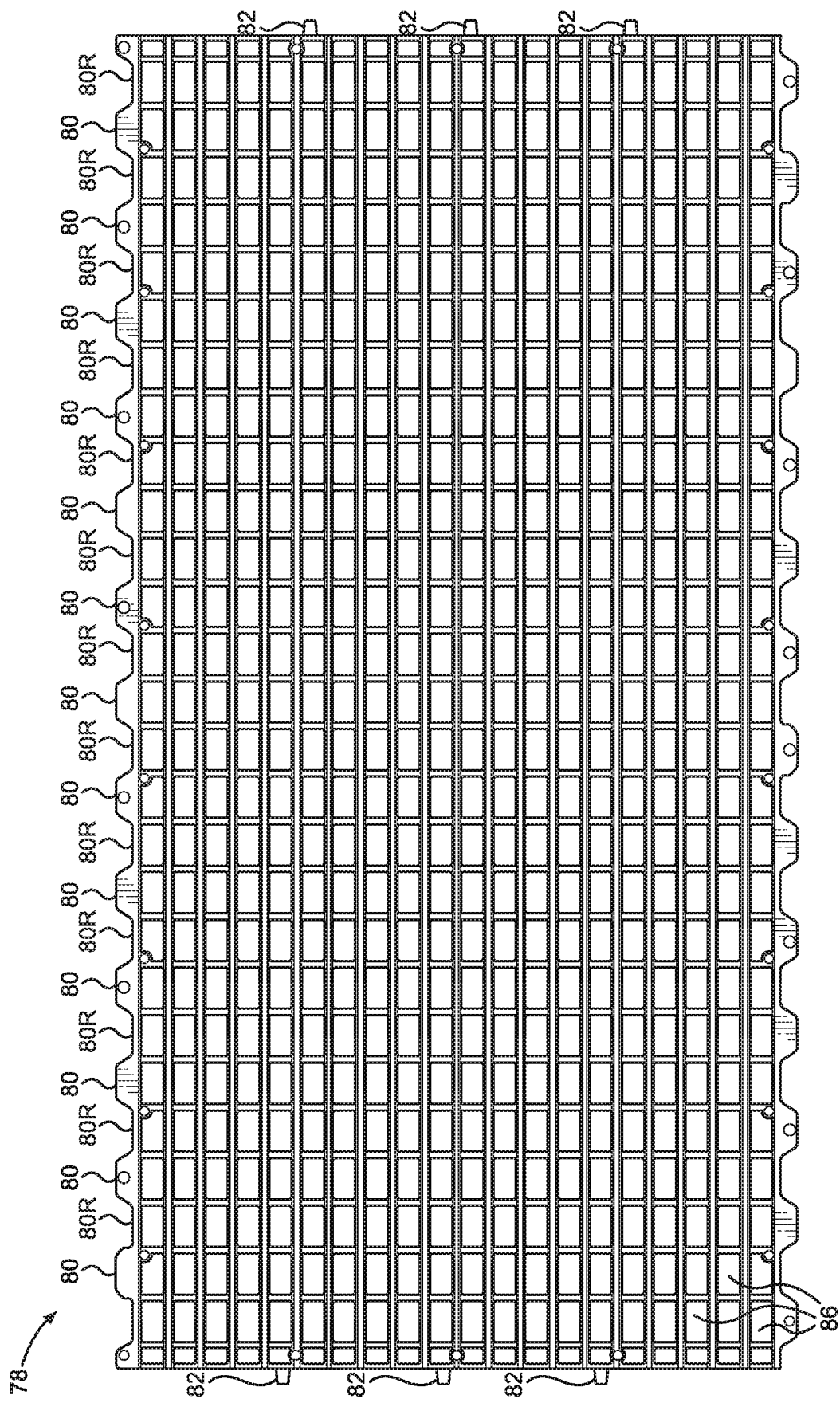
FIG. 4 is a top view of the floor panel.
Figure 5:
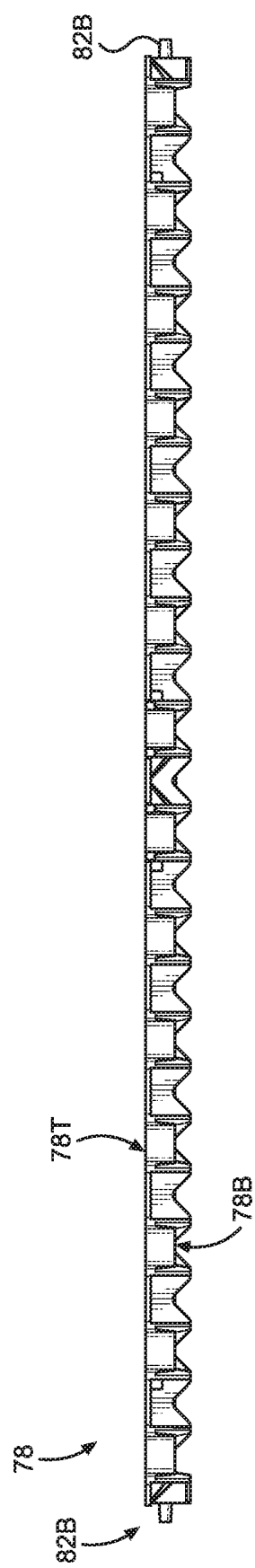
FIG. 5 is a side view of the floor panel.

As shown in FIGS. 3 and 4, flooring panels 78 have top and bottom surfaces constructed with slots 86 extending therethrough. Slots 86 are structured as rectangular apertures formed in non-porous surface material to allow droppings and water to pass therethrough to the ground below. The slots are sized, shaped, and positioned to allow animals or poultry to comfortably walk over the surface area of the flooring panel but not to allow the feet of the animals to pass through the slots in order to minimize the risk of injury to the feet and legs of the animals or poultry housed therein. The flooring panels 78 and slots 86 are further formed including non-porous surface materials having low surface energies which resist microbial biofilm and bacteria attachment. This microbial resistance helps to reduce the build-up of manure in the slots and on panel surfaces to thereby facilitate cleaning of the panels and improve the condition and health of the housed animals or poultry.

In a preferred embodiment as shown in FIGS. 3 and 4, the slots 86 are sized and positioned to allow chickens to stand on and walk over the surface area of the flooring panel but not to allow the feet of the chicken to pass therethrough, thereby minimizing the risk of injury to the feet and legs thereof. Those having skill in the art will understand that the flooring panel slots or apertures can be of a variety of shapes and may all be of the same shape or a plurality of shapes throughout the panel. Examples of shapes include, but are not limited to, rectangular, diamond shaped, circular, triangular, honeycomb or octagonal, wave shaped, any other rhomboidal or trapezoidal shape, or specific ornamental shape. The particular shape and spaced apart relationship of slots adopted for panels should be suitable for the purposes of supporting an intended animal or chicken disposed thereon and to optimize the easy passage of droppings and water therethrough. It will be understood that the sizes, dimensions, shapes, and positioning of panel slots or apertures can be a function of the typical size of animal or poultry intended to be housed.

The underside of the flanges 80 are configured to engage with the underlying elongate support beam 12 in supporting engagement to support the panel 78 on the beams as shown in FIG. 3. The elongate support beam 12, end frame board 68 and crossbeam 70 design improves the overall strength and durability of the flooring system 10 wherein loading on the panel 78 is at least partially transferred to other surfaces of the beams. This provides additional structural integrity to floor panel 78 between adjacent elongate support beams 12. Preferably, each flange 80 includes a hook member 80H depending from the laterally flange projections 80P for engagement over the elongate support beam 12 at the pluralities of ribs 24, 26, as shown in FIG. 3. Ribs 24, 26 provide a gripping surface to thereby prevent disengagement of the flanges by lateral displacement of the flanges with respect to the elongate support beam 12. It will be understood, however, that in the embodiment illustrated, the various components of the modular flooring panels and beams are disconnectable from each other to facilitate cleaning of the flooring system 10 and to enable replacement of a small component thereof rather than having to replace the flooring if one small section becomes damaged or deteriorates in some manner.

Although the preferred embodiment shown in FIGS. 1-6 includes panels, those of ordinary skill in the art will understand the term "panel" is used in a functional sense indicating a generally rectangular, flat frame member defining a plurality of apertures or slots, or a framework of parallel cross bars, made to form a part of a surface, or that forms a separate or distinct part or section of a surface, or is set into a surface of a floor, wall, ceiling, fence, or of any surface raised above or sunk below a general level, or enclosed by a frame or border, or a raised or sunken section of a surface set off by a margin. Examples of other forms include, but are not limited to, slats, slatted or slotted frames, grids, grates, mats, mesh or screen having rectangular or diamond shaped apertures. Those of skill in the art will understand that any suitable apertured frame member may be used in forming the panel described herein.

The plurality of flooring panels 78, which are not necessarily drawn to scale, are shown having the same outer dimensions. A multitude of various dimensions for any given installation could be selected. For the embodiment described herein, widths and lengths provided in increments of 12 inches was chosen. The panels may be of any appropriate dimension depending upon the installation, with widths and lengths in increments of 12 inches being provided by the inventor. The panels are sized and dimensioned to provide to the flooring, when installed, either of a straight-edge abutment with a wall of the housing in which the flooring system is installed or with a perimeter gap therebetween. The provision of perimeter gaps improves the ease by which the flooring may be navigated by farm personnel, may be cleaned, and the effectiveness of the cleaning, to thereby maintain a cleaner environment to reduce the risk of disease.

Those of skill in the art will understand that a number of variations may be made in the disclosed embodiments, all without departing from the scope of the invention which is defined solely by the appended claims. Flooring panels 78 are preferably comprised of high grade polypropylene thermoplastic which has superior impact and wear resistance, is mechanically rugged, heat resistant, has a high chemical resistance and is easy to cut and handle. The panel material includes non-porous surfaces 84 and may be sufficiently flexible such that, as animals move therealong the panels 78, flexure can occur. By providing such flexure, the animals will be afforded a resilient surface, and risk of injury to the animals thereby will be minimized. Other materials are available that would be suitable for alternative embodiments of the subject matter of the disclosure. Examples include, but are not limited to, thermoplastics, thermoplastic elastomers, high-density polymers, plastic, nylon, vinyl, polyvinyl chloride, rubber materials, carbon fiber, resin, treated wood, metallic materials such as aluminum, steel, metal composites or alloy, expanded metal mesh or screen material coated in plastic material including polyurethane to protect the metal, antimicrobial coatings, any combination thereof, or any other materials that provide uniform resilience, strength and stress distribution throughout the structure.

As indicated above, the underside of flange 80 includes hook member 80H configured to hook over elongate support beam 12 to interlock the panel system as shown in FIG. 3. This can help maintain the position of the panels and insure that the flooring panels to not become separated from one another. Turning now to FIGS. 7-12, elongate support beam 12 is formed with a lower region including a lower, base end 14, rectangular sides including a lower, outwardly sloping first wall portion 16, and a lower, outwardly sloping second wall portion 18. Elongate support beam 12 further includes an upper region having a vertically extending first upper parallel wall portion 20 formed with a plurality of first ribs 24, a vertically extending second upper parallel wall portion 22 formed with a plurality of second ribs 26, and an apex 36 having a planar top surface 38. In a preferred embodiment, elongate support beam 12 is a generally triangular prism shape having generally rectangular sides, first and second generally triangular end faces 40A, 40B and further including an outwardly sloping base end 14 having a generally triangular cross section and arcuate bottom surface, as shown in FIGS. 7 and 11-14. The generally rectangular sides include lower outwardly sloping first and second wall portions 16, 18 and generally triangular shape of base end 14 that serve to distribute any weight or pressure load from the flooring against the lower portion of the elongate support beam 12 and thereby remove load from the flanges and bosses of the flooring panels 78. As shown in FIGS. 3, 7 and 10-14, the generally rectangular sides further include an upper portion formed as vertically extending parallel wall portions 20, 22. The first upper parallel wall portion 20 is formed having a first plurality of ribs 24 and a first plurality of channels 28 wherein each individual rib is separated by a channel such that first upper parallel wall portion 20 is characterized by alternating ribs 24 and channels 28 therebetween each rib. The second upper parallel wall portion 22 is formed having a second plurality of ribs 26 and a second plurality of channels 30 wherein each individual rib is separated by a channel such that second upper parallel wall portion 22 is characterized by alternating ribs 26 and channels 30 therebetween each rib. The term "rib" is used in a functional sense indicating a structural element constructed as an elongated projection formed across or through a surface, serving to provide stiffening, strengthening or support thereto. Examples of other forms include, but are not limited to, raised bands or ridges of material, webs or battens. Those of ordinary skill in the art will understand that any suitable structural element may be used in forming the ribbed portions. As indicated above, ribs 24, 26 additionally form a textured gripping surface to thereby prevent disengagement of the flanges by lateral displacement of the flanges with respect to the elongate support beam 12. Upper parallel wall portions 20, 22 terminate in apex 36 having a planar top surface 28 for engagement with hooks 80H located on underside of flanges 80 as described above.

Figure 7:
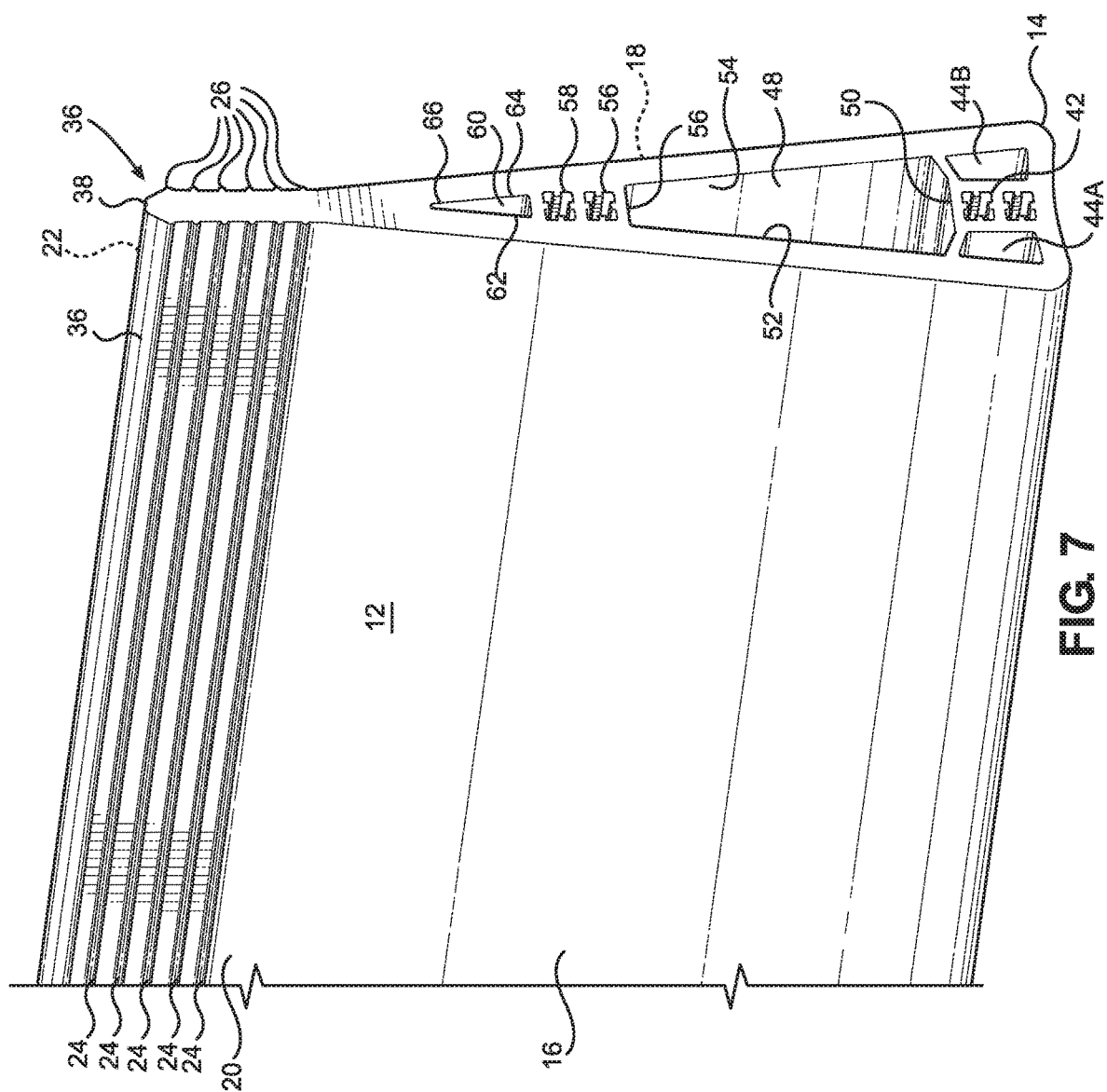
FIG. 7 is a perspective end view of the elongate support beam of FIG. 1.
Figure 8:
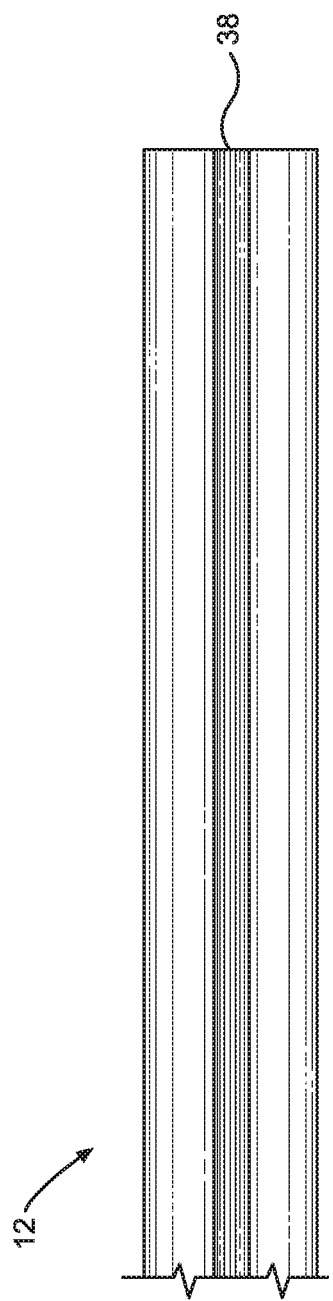
FIG. 8 is a top view of the elongate support beam.
Figure 9:
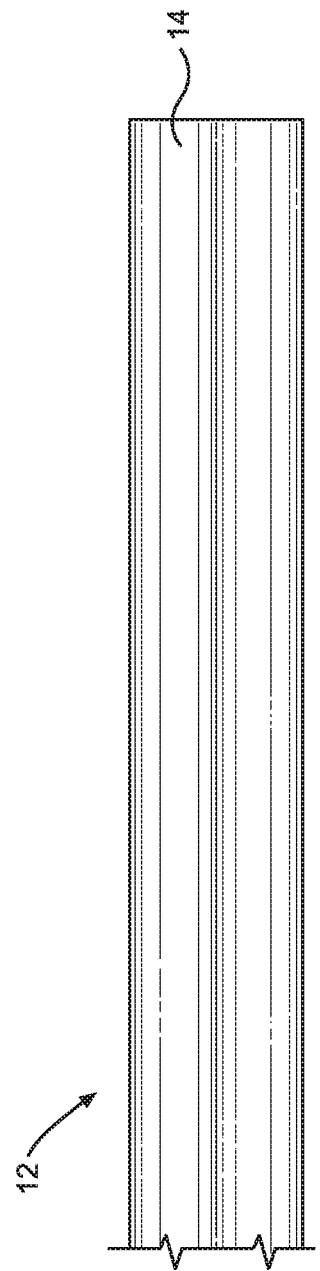
FIG. 9 is a bottom view of the elongate support beam.
Figure 11:
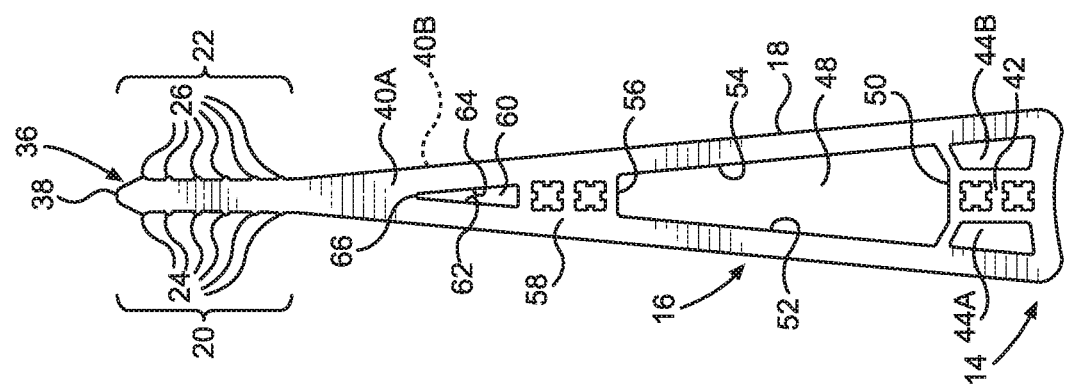
FIG. 11 is an end view the elongate support beam.
Figure 10:
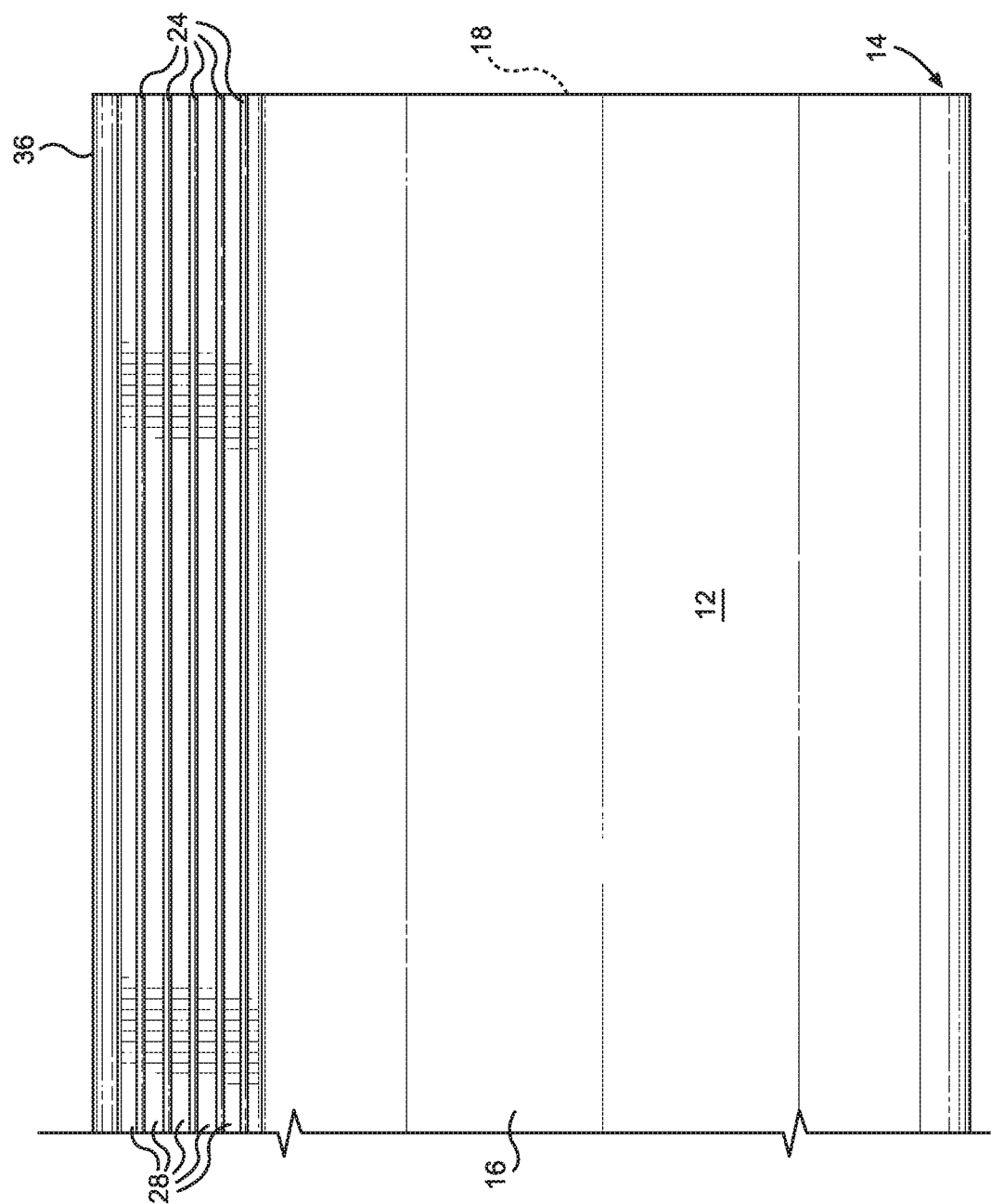
FIG. 10 is a side view of the elongate support beam.
Figure 12:
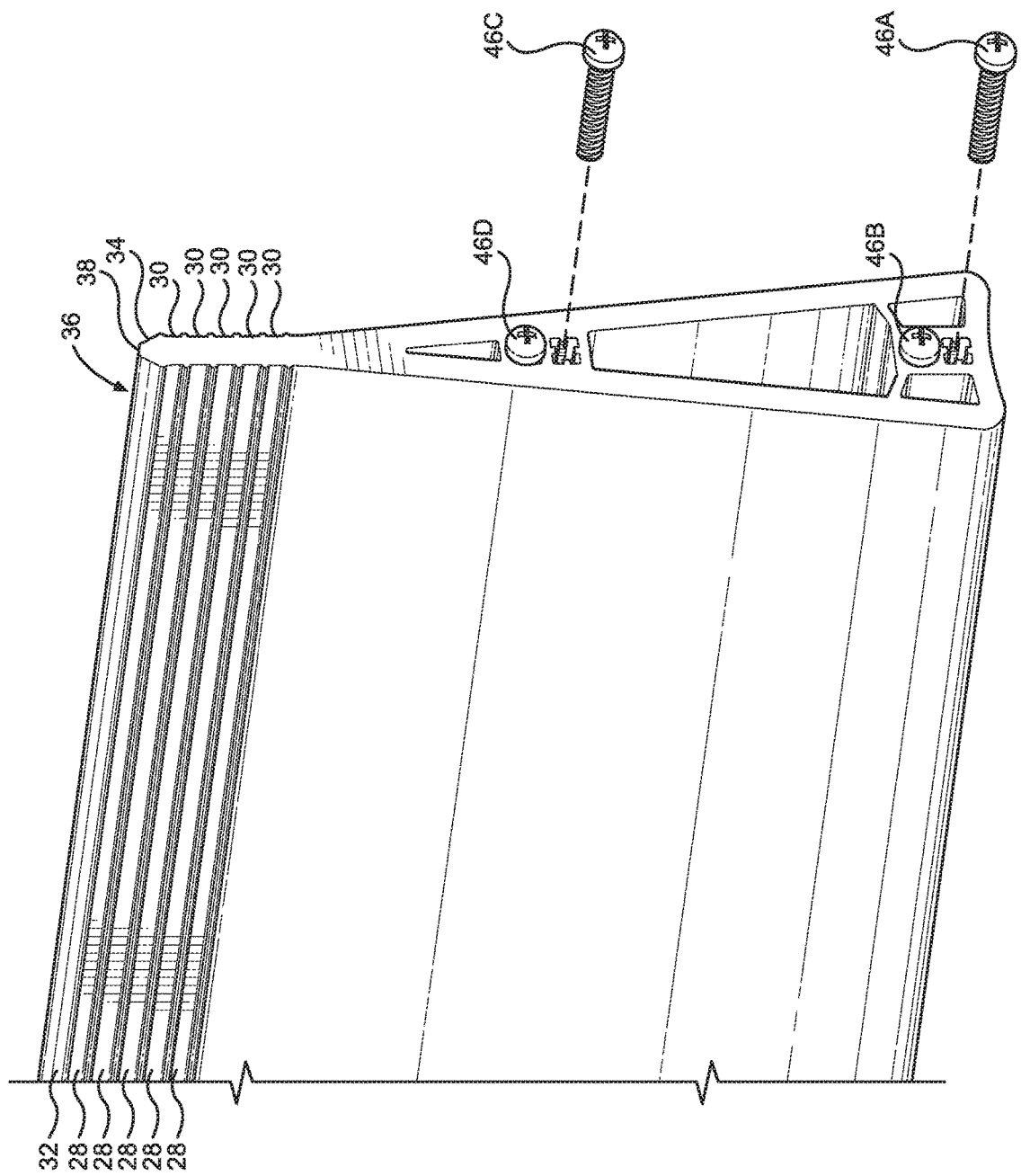
FIG. 12 is a perspective end view of the elongate support beam receiving fastening members.

As shown in FIGS. 7 and 11-12, lower, base end 14 of elongate support beam 12 includes a lower central securement portion 42 for receiving mechanical fasteners 46A, 46B. Lower central securement portion 42 is flanked by first flanking bore 44A and second flanking bore 44B. The lower, outwardly sloping first wall portions 16 has an inner surface 52 and the lower, outwardly sloping second wall portions 18 has an inner surface 54. Inner surfaces 52, 54 of wall portions 16, 18 define an intermediate longitudinal bore 48 extending through elongate support beam 12 parallel to the longitudinal axis of the elongate support beam 12. Intermediate longitudinal bore 48 is defined by a floor 50, an intermediate longitudinal bore vertex 56, an intermediate first inner sidewall 52 of the lower outwardly extending first wall portion 16, and an intermediate second inner sidewall 54 of the lower outwardly extending second wall portion 18. An upper central securement portion 58 receives mechanical fasteners 46C, 46D. An upper longitudinal bore 60 is defined by an upper first inner sidewall 62, an upper second inner sidewall 64, and an upper longitudinal bore vertex 66. The flanking bores 44A, 44B, intermediate longitudinal bore 48 and upper longitudinal bore 60 coact with the generally triangular shape and arcuate bottom surface of the lower base end 14 to distribute additional load from the flooring against the lower regions of the elongate support beam 12 to remove additional load from the flooring and to thereby provide a support beam base of optimal strength. In addition, the improved base and fasteners remove the need for any end brackets thus reducing the cost of the flooring system and thereby promoting economic efficiency.

In a preferred embodiment, the elongate support beams are fabricated of a fiber reinforced plastic (FRP) or of steel. Other materials are available that would be suitable for alternative embodiments of the subject matter of the disclosure. Examples include, but are not limited to, carbon fiber reinforced polymer materials, composite polymer materials, high-density polymers, thermosetting plastic, plastic, nylon, vinyl, epoxy, polyvinyl chloride, polyurethane, rubber materials, carbon fiber, resin, treated wood, metallic materials such as aluminum, metal composites or alloys, or any combination thereof, or any other materials that provide material and mechanical properties of porosity, uniform strength and resilience throughout the structure.

In a preferred embodiment, the mechanical fasteners 46A, 46B, 46C and 46D are screw bosses that are received in and pass through the lower and upper central securement portions 42, 58 and extend longitudinally through the length of elongate support beam. Other fasteners that would be suitable for alternative embodiments include, but is not limited to, screws, bolts, pins, and any other mechanical fasteners that are available that have the material properties that would be suitable for alternative embodiments of the subject matter of the disclosure. Those having ordinary skill in the art will understand that a number of variations may be made in the disclosed embodiments, all without departing from the scope of the inventions, which is defined solely by the appended claims.

Figure 13:
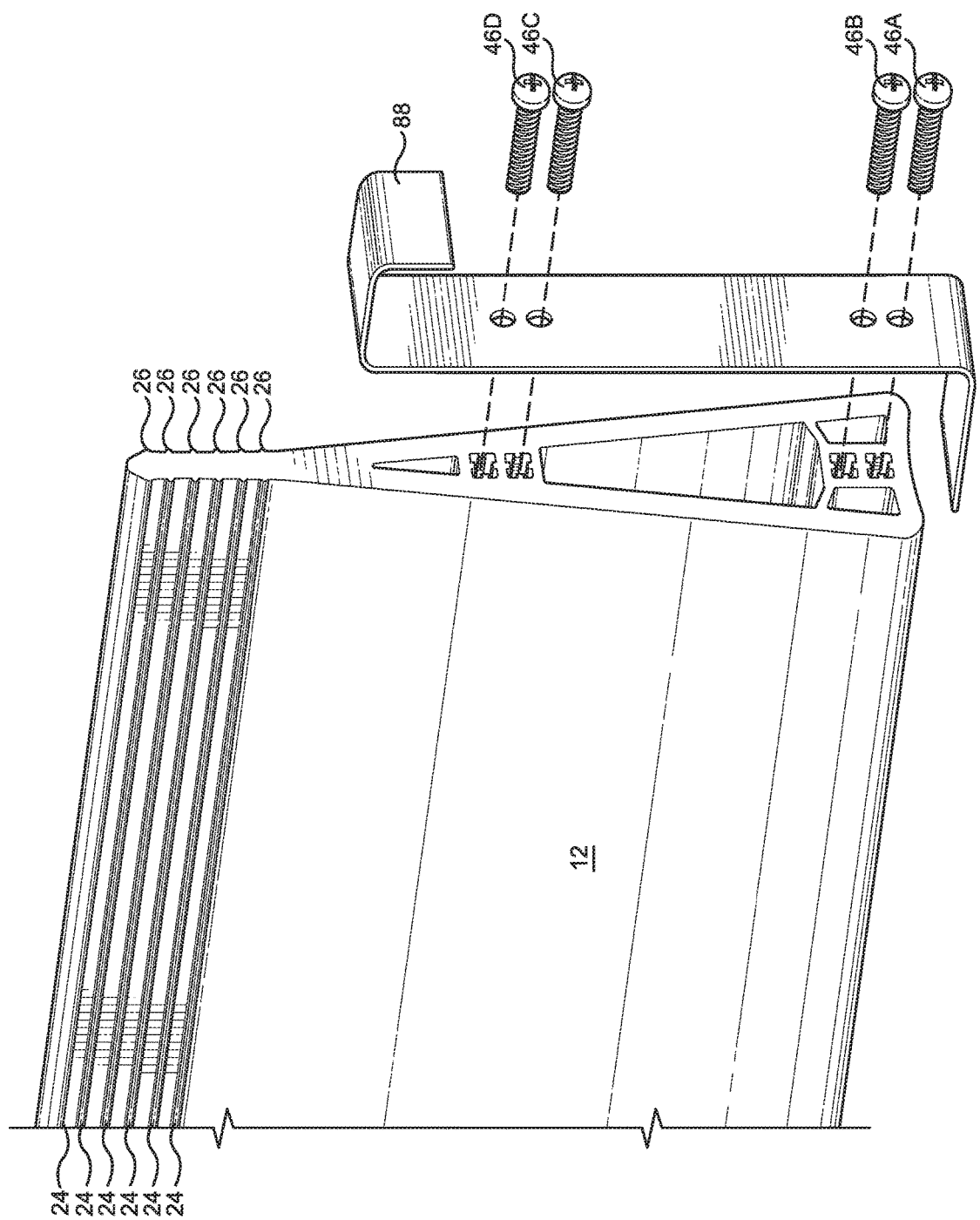
FIG. 13 is a perspective end view of an elongate support beam receiving a bracket and fastening members according to an embodiment of the current invention.
Figure 14:
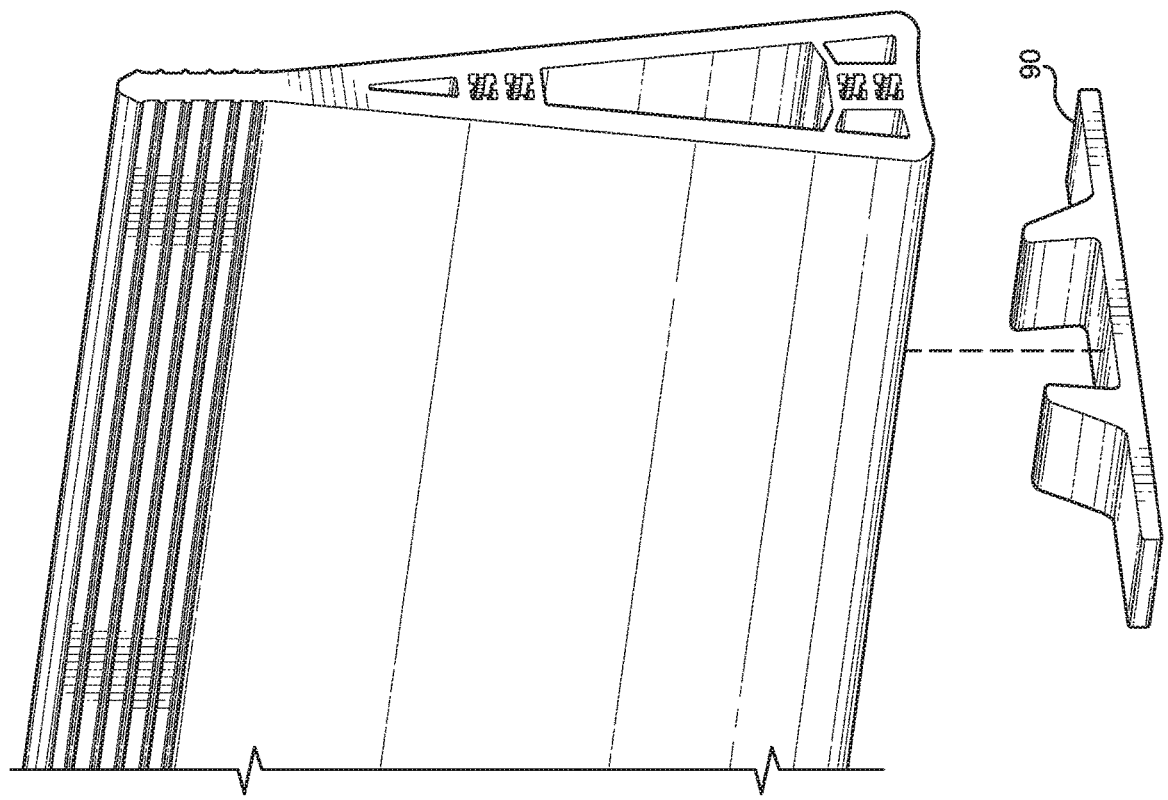
FIG. 14 is a perspective end view of an elongate support beam received in a floor bracing support stand according to an embodiment of the current invention.
Figure 15:
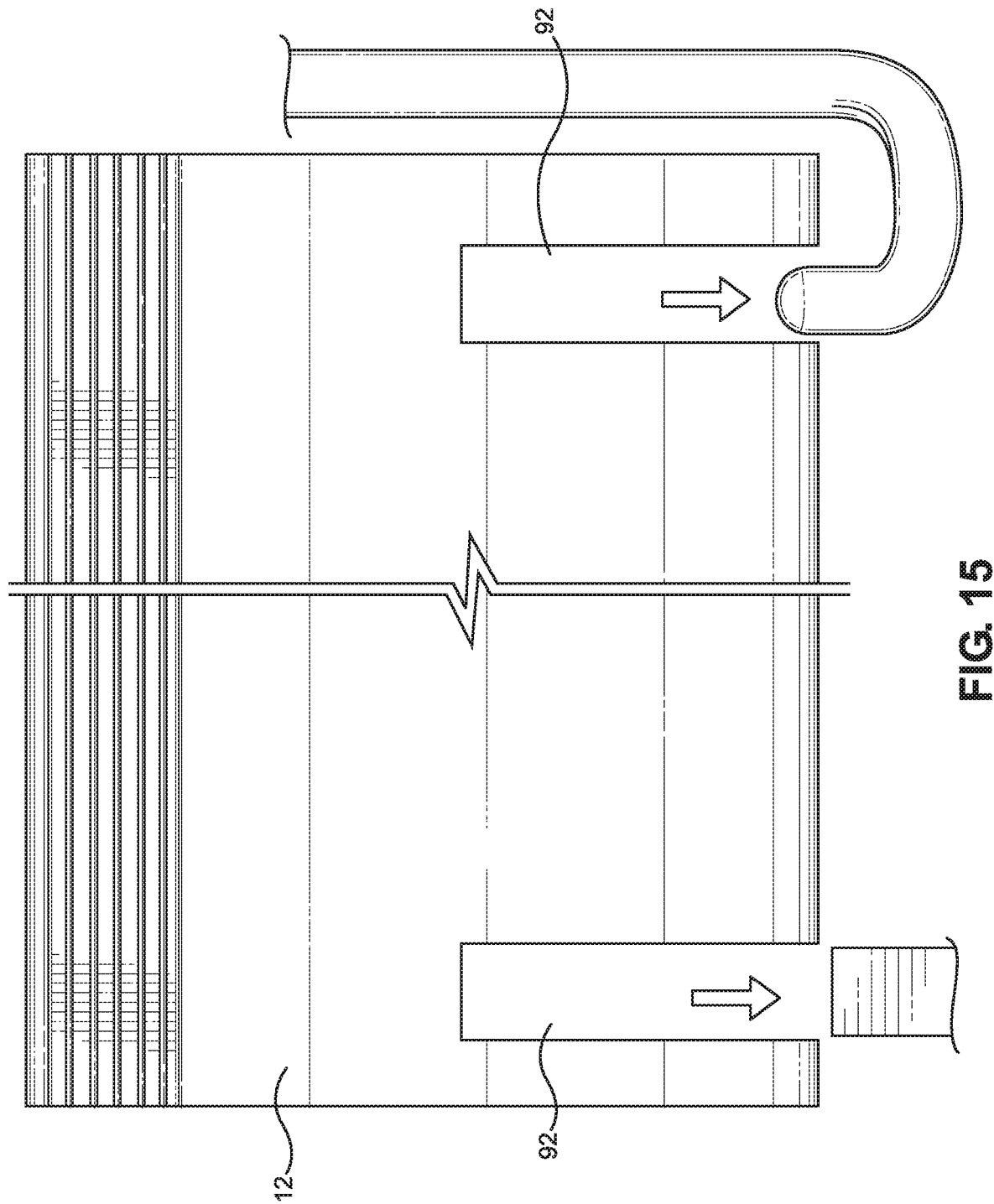
FIG. 15 is a side view of an elongate support beam formed with slots for receiving hook and mounting accessories according to an embodiment of the current invention.

As shown in FIGS. 13 and 14, the provision of accessories including a mounting bracket 88, or a beam support stand 90 to facilitate mounting the elongate support beam thereby enabling the use of the flooring system 10 in a variety of elevations and applications. As shown in the embodiment of FIG. 15, elongate support beam may further include beam slots 92 to facilitate hooking and mounting of the beam.

It is to be understood that, while a modular embodiment of the flooring system 10 wherein the various components thereof are disassemblable from one another has been described herein, such an embodiment is not exclusive. Other embodiments are envisioned as being within the scope of the invention. For example, the crossbeams 70, elongate support beams 12 and end frame board 68 might be unitarily constructed of components welded or affixed together to form a rigid flooring support frame.

The selection of suitable materials based on known properties of specific weight, durability, porosity, elasticity, toughness and strength would be within the ability of a person skilled in the art. Those in the art will understand that any suitable material, now known or hereinafter developed, may be used in forming the portions described herein. Those of skill in the art will understand that a number of variations may be made in the disclosed embodiments, all without departing from the scope of the invention, which is defined solely by the appended claims.

It will be understood that this disclosure, in many respects, is only illustrative. Changes may be made in details, particularly matters of shape, size, material, and arrangement of parts without exceeding the scope of the invention. Accordingly, the scope of the invention is as defined in the language of the appended claims.

Although the present invention has been described in considerable detail with reference to certain preferred versions thereof, other versions are possible. Therefore, the spirit and scope of the appended claims should not be limited to the description of the preferred or exemplary embodiments herein. A substantive encapsulation of the invention has been provided using specific terms and drawings. Such illustrations are for representative purposes only and are not intended to capture all iterations and variations of the invention.

It will be appreciated that the above description relates to a specific embodiment of the invention, provided by way of example only. A number of variations are possible, and would be obvious to those of ordinary skill in the art. Such obvious variations are within the scope of the invention as defined and claimed, whether or not expressly recited. Although specific arrangements are shown in the exemplary embodiment, any suitable structures, attachments or mechanisms can be employed to perform the function recited herein; neither the present disclosure nor the appended claims are limited to the specific arrangements or embodiments shown in the Drawings. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions, additions, or substitutions of equivalents are contemplated as circumstances may suggest or render expedient without departing from the scope of the disclosure, but is intended to cover the application or implementation without departing from the spirit or scope of the claims of the present invention. The terms "including" and "having" as used in the specification and claims shall have the same meaning as the term "comprising."

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A modular flooring system for agricultural animal housing, said system comprising:
    a plurality of flooring panels, each of said flooring panels comprising a top surface, a bottom surface, opposing side edges and opposing end edges;
    at least two elongate support beams;
    a plurality of flanges laterally extending from each opposing side edge for supporting engagement on said at least two elongate support beams for supporting said flooring panels, said plurality of flanges defining a plurality of recesses between adjacent flanges, said flanges and recesses adapted for mating engagement with corresponding flanges and recesses of an adjacent flooring panel;
    a plurality of bosses and apertures arranged on each opposing end edge adapted for interlocking engagement with corresponding bosses and apertures of an adjacent flooring panel;
    said at least two elongate support beams further comprise on the end faces thereof a lower central securement portion for receiving mechanical fasteners;
    an upper central securement portion for receiving mechanical fasteners; and
    an intermediate longitudinal bore vertically spaced therebetween said lower central securement portion and said upper central securement portion, and extending through the elongate support beam parallel to the longitudinal axis of the elongate support beam.

2. A modular flooring system for agricultural animal housing as claimed in claim 1 wherein,
    said plurality of flanges further comprise hook members depending from laterally extending flange projections for supporting engagement on said at least two elongate support beams; and
    said at least two elongate support beams interlocks each of said flooring panels, whereby said at least two elongate support beams prevent disengagement of said plurality of flanges by lateral displacement of said plurality of flanges with respect to said at least two elongate support beams.

3. A modular flooring system for agricultural animal housing as claimed in claim 2 wherein,
    said at least two elongate support beams comprise generally triangular end faces and generally rectangular sides, said generally triangular end faces and said generally rectangular sides defining a lower region and an upper region.

4. A modular flooring system for agricultural animal housing as claimed in claim 3 wherein,
    said lower region further comprises an outwardly sloping base end having a generally triangular cross section and arcuate bottom surface and first and second outwardly sloping wall portions, and said upper region further comprises first and second vertically extending parallel wall portions
    and an apex comprising a planar top surface.

5. A modular flooring system for agricultural animal housing as claimed in claim 4 wherein,
    said first and second vertically extending parallel wall portions further comprise a plurality of first and second ribs, respectively, forming a gripping surface in frictional engagement with said hook members.

6. A modular flooring system for agricultural animal housing as claimed in claim 1 wherein,
    said mechanical fasteners comprise screw bosses.

7. A modular flooring system for agricultural animal housing as claimed in claim 6 wherein,
    said at least two elongate support beams further comprise an upper longitudinal bore vertically spaced above said intermediate longitudinal bore.

8. A modular flooring system for agricultural animal housing as claimed in claim 7 wherein,
    said lower central securement portion is flanked by first and second flanking bores; and
    said flanking bores, said intermediate longitudinal bore and said upper longitudinal bore coact with said outwardly sloping base end and said arcuate bottom surface to distribute load from said plurality of flooring panels and said plurality of flanges against said lower regions of said at least two elongate support beams.

9. A modular flooring system for agricultural animal housing as claimed in claim 4 wherein,
    said at least two elongate support members further comprise a mounting bracket.

10. A modular flooring system for agricultural animal housing as claimed in claim 4 wherein,
    said at least two elongate support members further comprise a mounting stand.

11. A modular flooring system for agricultural animal housing as claimed in claim 4 wherein,
    said at least two elongate support members further comprise beam slots for receiving a hook mounting accessory.

12. A modular flooring system for agricultural animal housing as claimed in claim 1 wherein,
    said top surface comprises slots therethrough, said slots further comprised of non-porous surface material.

13. A modular flooring system for agricultural animal housing, said system comprising:
- a flooring panel comprising a top surface, a bottom surface, opposing side edges and opposing end edges;
- at least two elongate support beams;
- a plurality of flanges laterally extending from each opposing side edge for supporting engagement on said at least two elongate support beams for supporting said flooring panel, the plurality of flanges defining a plurality of recesses between adjacent flanges, the flanges and recesses adapted for mating engagement with corresponding flanges and recesses of an adjacent flooring panel;
- a plurality of bosses and apertures arranged on each opposing end edge adapted for interlocking engagement with corresponding bosses and apertures of an adjacent flooring panel; and
- said at least two elongate support beams further comprise generally triangular end faces, and generally rectangular sides, said generally rectangular sides comprising an outwardly sloping base end having a generally triangular cross section and arcuate bottom surface, first and second outwardly sloping wall portions, first and second vertically extending parallel wall portions, and an apex comprising a planar top surface;
- said at least two elongate support beams further comprise on the end faces thereof a lower central securement portion for receiving mechanical fasteners;
- an upper central securement portion for receiving mechanical fasteners; and
- an intermediate longitudinal bore vertically spaced therebetween said lower central securement portion and said upper central securement portion, and extending through the elongate support beam parallel to the longitudinal axis of the elongate support beam.

* * * * *